United States Patent [19]

Graflind

[11] Patent Number: 4,788,417
[45] Date of Patent: Nov. 29, 1988

[54] ELECTRICAL HEATING PAD

[75] Inventor: Leif Graflind, Järfälla, Sweden

[73] Assignee: Kanthal Medical Heating AB, Järfälla, Sweden

[21] Appl. No.: 13,984

[22] PCT Filed: May 7, 1986

[86] PCT No.: PCT/SE86/00216
§ 371 Date: Jan. 7, 1987
§ 102(e) Date: Jan. 7, 1987

[87] PCT Pub. No.: WO86/06920
PCT Pub. Date: Nov. 20, 1986

[30] Foreign Application Priority Data

May 7, 1985 [SE] Sweden .............................. 8502249

[51] Int. Cl.$^4$ ............................................. H05B 3/34
[52] U.S. Cl. ................................. 219/528; 219/212; 219/529
[58] Field of Search .............. 219/212, 217, 483, 484, 219/486, 488, 494, 497, 499, 504, 505, 506, 528, 539, 549, 529

[56] References Cited

U.S. PATENT DOCUMENTS

| | | | |
|---|---|---|---|
| 2,745,942 | 5/1956 | Cohen | 219/499 X |
| 3,739,142 | 6/1973 | Johns | 219/212 |
| 4,149,066 | 4/1979 | Niibe | 219/505 |
| 4,322,604 | 3/1982 | Kawamura et al. | 219/497 |
| 4,507,546 | 3/1985 | Fortune et al. | 219/497 |
| 4,514,619 | 4/1985 | Kugelman | 219/483 |

Primary Examiner—E. A. Goldberg
Assistant Examiner—M. Lateef
Attorney, Agent, or Firm—Pollock, Vande Sande & Priddy

[57] ABSTRACT

An electrical heating pad, in particular a mattress to be placed under a patient during surgery, comprising a number of partially overlapping resistor elements (11-18). The foil elements cover different regions of the pad and are positioned in an overlapping configuration such that in substantially all portions of the pad there are at least two overlapping foil element parts. Each foil element is fed separately from control circuitry so as to maintain a uniform temperature at all portions of the pad, irrespective of the heating load at different portions.

12 Claims, 3 Drawing Sheets

ELECTRICAL HEATING PAD

FIELD OF THE INVENTION

The present invention relates to an electrical heating pad, in particular a mattress, comprising a number of partially overlapping resistor foil elements.

BACKGROUND OF THE INVENTION

An electrically heated mat with partially overlapping resistor foil elements is known from U.S. Pat. No. 2,745,942. In this known mat, the resistor foil elements are disposed in three layers, one on top of the other, and the outline or outer contour of each element basically coincides with the contour of the mat. However, the individual resistor foil paths are displaced or staggered relative to the foil paths of the other foil elements, so that the various foil paths supplement each other and together cover substantially the whole surface area of the mat. In this way, a uniform and intensive heating of the mat can be achieved.

SUMMARY OF THE INVENTION

The main object of the present invention, on the other hand, is to provide an electrical heating pad which can be monitored in use so that local heat variations, in particular hot spots, can be detected. A further object is to control the heating in such a manner that local heat variations, e.g., those caused by a non-uniform load, are eliminated. Thus, it is desirable to achieve a uniform temperature distribution over the pad even when the load or heat transfer is concentrated to certain portions of the pad.

A special application, where such monitoring and control of the heat is important or even critical, is the use of the pad as a mattress for a patient during surgery. Of course, the normal physiological temperature control of the human body is then partially non-effective, and there is consequently a need for a mattress which can monitor and preferably control the temperature at all portions thereof.

According to the invention, the above-mentioned main object is met by an electrical heating pad, in which the various foil elements cover different regions of the pad and are positioned in such an overlapping configuration that in substantially all portions of the pad there are at least two overlapping foil element parts, wherein each foil element in such a pair of partially overlapping foil elements has a separate pair of feed terminals for electrically feeding the foil elements separately so as to permit individual sensing of the respective temperature-dependent resistance thereof. Thus, the foil elements have a dual function, i.e., they serve as heating elements as well as temperature measuring elements, and no separate temperature sensing means, such as thermistors, are needed. If a hot spot occurs, the temperature increase will be sensed by at least two foil elements, or at least one if the other does not operate properly. Upon detection, this information can be used to provide an alarm signal or to control the electrical power supplied to the particular foil element or elements so as to maintain a uniform temperature distribution.

The invention also concerns electrical circuitry for electrically feeding and monitoring such a heating pad, the circuitry including a number of circuit units connectable between a power source and each one of the terminal pairs of the pad, each such circuit unit being adapted to sense the temperature-dependent resistance of the corresponding foil element, whereby the temperatures of the various foil elements are monitored individually. Preferably, these circuit units are also adapted to control the feeding voltage to the terminal pairs so as to keep all parts of the heating pad at a predetermined temperature value.

The partially overlapping arrangement of the foil elements in the pad, especially in combination with the electrical circuitry for feeding, monitoring and control thereof, provides excellent security. Thus, if a particular foil element or the control thereof fails, this will be taken care of by the other, partially overlapping foil elements. In case the remaining operative foil elements cannot provide adequate compensation, the respective foil elements are preferably inactivated by means of a security switch. However, normally, reasonable variations in heat transfer from any part of the pad can be fully compensated for, at least if the number of foil elements is relatively high so that the total area of the pad is divided into a large number of local areas defined by a particular pair of partially overlapping foil elements.

In this context, the "area" of a foil element is defined as the area confined within the outer contour of the resistor foil path, which may have any desired internal configuration, e.g., with meander-like, sinusoidal or labyrinthine loops distributed over the internal area in a substantially uniform manner, as is known in the art. The term "foil element" is defined herein primarily as a metal resistor foil strip embedded between two sheets of electrically insulating material, preferably a thermoplastic, flexible material. Alternatively, a "foil element" can be made of a semiconductive, flexible material, such as PVC doped with electrically conductive micro particles. Furthermore, the terms "overlapping" and "partially overlapping" concern the foil elements as a whole.

BRIEF DESCRIPTION OF THE DRAWINGS

In order that the invention may be more clearly understood, a preferred embodiment will be described with reference to the appended drawings, in which.

DESCRIPTION OF PREFERRED EMBODIMENT

Figure 1:
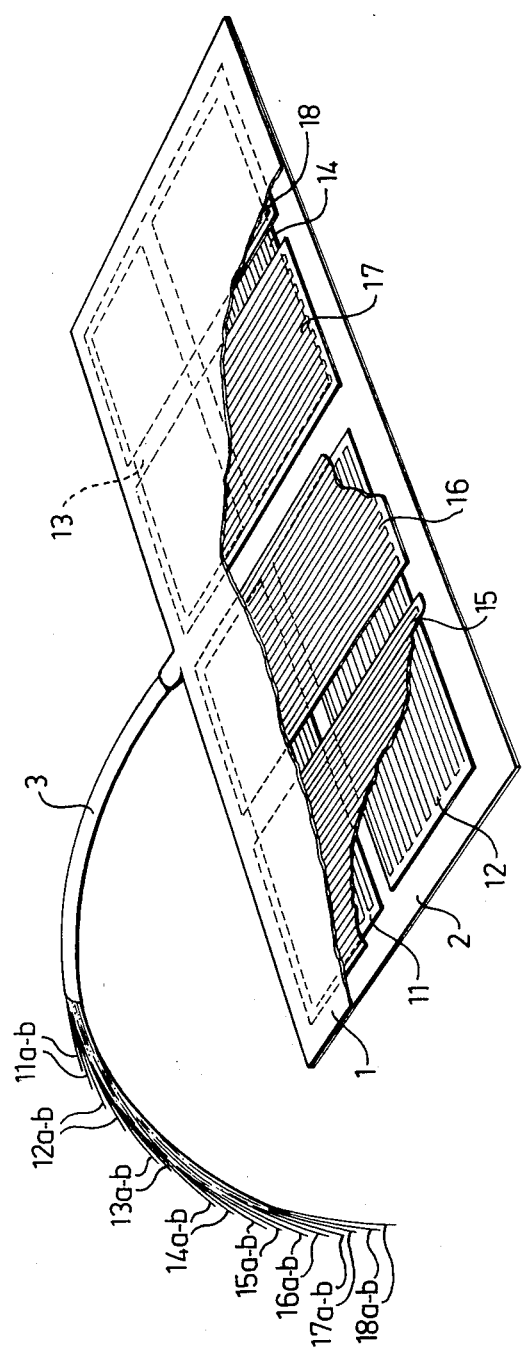
FIG. 1 shows a perspective view of a mattress according to the invention with partially cut-away parts.

As illustrated in FIG. 1, a preferred embodiment of the electrical heating pad according to the invention is constituted by a generally rectangular mattress to be placed under a patient lying on an operating table. In the illustrated example, the mattress has the dimensions 900×450 mm so as to fit onto the central section of an operating table.

The mattress consists of two outer protective sheets 1,2 of a flexible thermoplastic material, such as PVC, sealed hermetically all around the circumference and enclosing therebetween, apart from possible layers of a soft material (not shown), a number (e.g., eight) of partially overlapping resistor foil elements 11–18 serving to heat the mattress uniformly to a desired temperature.

The foil elements 11–18 may be of a kind which is commercially available, wherein each foil element consists of a pair of rectangular thermoplastic flexible sheets embedding therebetween a metal foil strip following a path of meander-like loops. Preferably, the foil strips are made of brass having a temperature coefficient of about 0.15% per degree C.

According to the invention, the foil elements 11–18 are dimensioned and arranged so as to cover different regions of the mattress and to partially overlap each other, so that in substantially all portions of the mattress there are two overlapping foil element parts. In particular, four foil elements 11, 12, 13 and 14 are positioned in the longitudinal direction of the mattress, the two elements 11 and 12 being placed side by side in one longitudinal half of the mattress and the two elements 13 and 14 being placed side by side in the other longitudinal half of the mattress. The remaining four foil elements 15, 16, 17 and 18 are positioned in a transversal direction (perpendicularly to the longitudinal direction), so that each of the transversal elements 15 and 16 crosses and overlaps the two longitudinal elements 11 and 12, and the transversal elements 17 and 18 cross and overlap the other two longitudinal elements 13 and 14. Thus, the mattress is divided into eight substantially square regions each defined by a particular combination of foil element parts, namely 11/15, 11/16, 12/15, 12/16, 13/17, 13/18, 14/17 and 14/18, respectively.

Furthermore, according to the invention, each foil element 11–18 has a separate pair of electrical terminals 11a–b, 12a–b, 13a–b, 14a–b, 15a–b, 16a–b, 17a–b and 18a–b brought together (although electrically insulted) into a common cable 3. Thus, the cable 3 includes 16 individual wires. In this way, it is possible to feed each foil element individually with an electrical current from a power source. Also, each foil element can be monitored and controlled individually so as to maintain a uniform temperature over the mattress, even if the heat transfer from the mattress is unevenly distributed.

Figure 2:
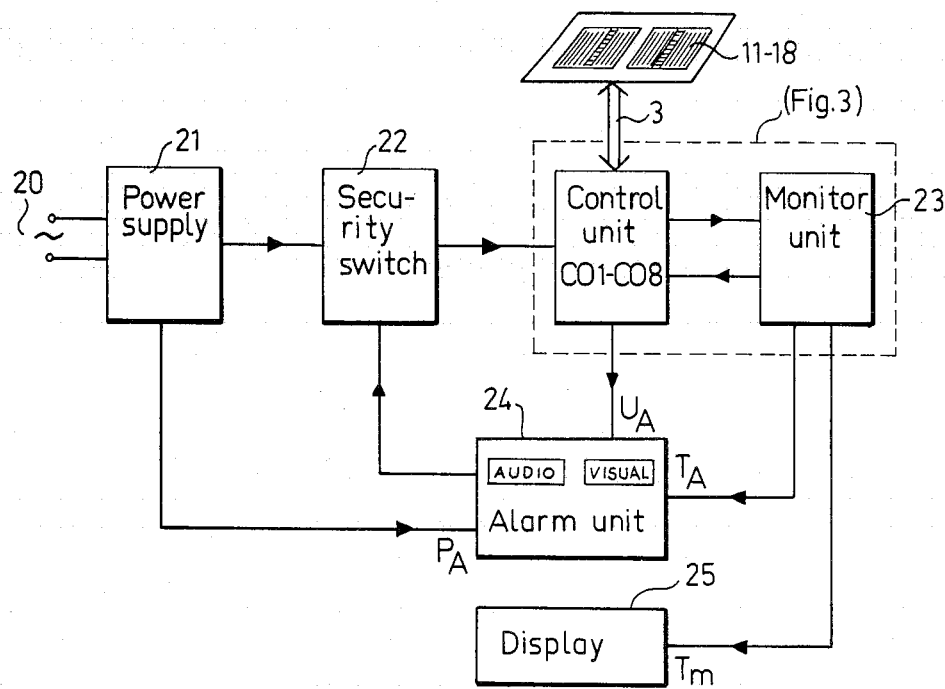
FIG. 2 is a schematic block diagram illustrating the principal parts of electrical circuitry for monitoring and controlling the electrical power being fed to the foil elements of the mattress of FIG. 1.

FIG. 2 illustrates a preferred embodiment of electrical circuitry adapted to provide such a monitored and controlled electrical feeding of the various foil elements 11–18 of the mattress. The circuitry comprises a power supply unit 21 adapted to be connected to a regular AC current source (220 V) and to deliver a stabilized, lower DC current (24 V) via a security switch 22 to eight control units C01–C08, each control unit feeding a corresponding one of the foil elements 11–18. The control units C01–C08 are conncted to a monitor unit 23 adapted to sequentially sense the resistance of the resistor strip in each foil element in order to monitor the temperature of each foil element, the temperature being dependent on the resistance. As indicated in FIG. 2, the power supply unit 21, the control units C01–C08 and the monitor unit 23 are all connected to an alarm unit 24 adapted to indicate any malfunctioning of the respective units by an audio or a visual signal. Also, the alarm unit 24 is adapted to activate the security switch 22 in case of such malfunctioning, so that the electrical power to all foil elements 11–18 is switched off. Furthermore, a display unit 25 will indicate the average temperature of the foil elements 11–18.

The alarm unit will be activated basically in three different cases. Thus, if the power supply unit 21 does not operate properly, a signal $P_A$ is delivered to the alarm unit 24. Furthermore, if any one of the control units C01–C08 delivers too high a voltage to the corresponding foil elements 11–18, an alarm signal $U_A$ is delivered to the alarm unit. Finally, if the monitor unit 23 senses a resistance value corresponding to a temperature which is too high or too low in any one of the foil elements 11–18, a temperature alarm signal $T_A$ is delivered to the alarm unit. In all these three cases, the power will be switched off automatically by the security switch 22.

Figure 4:
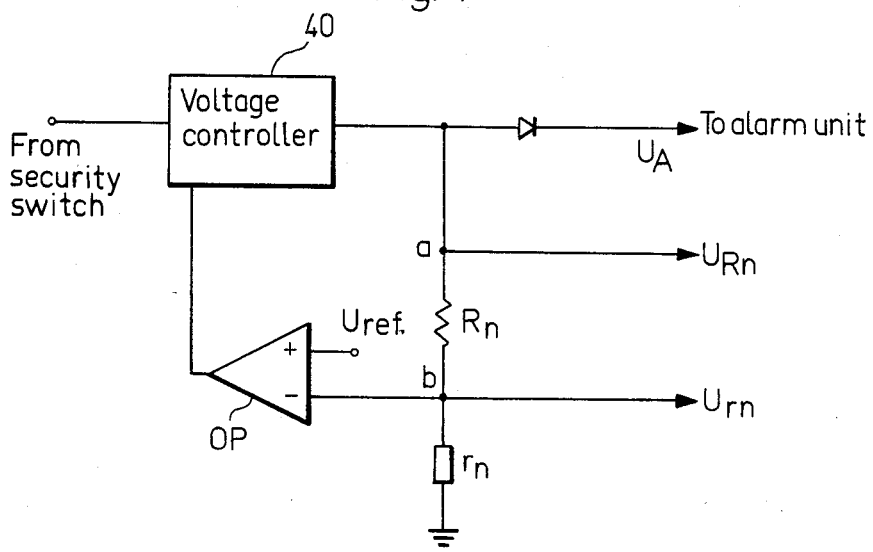
FIG. 4 is a simplified circuit diagram illustrating one of the control units included in FIGS. 2 and 3.
Figure 3:
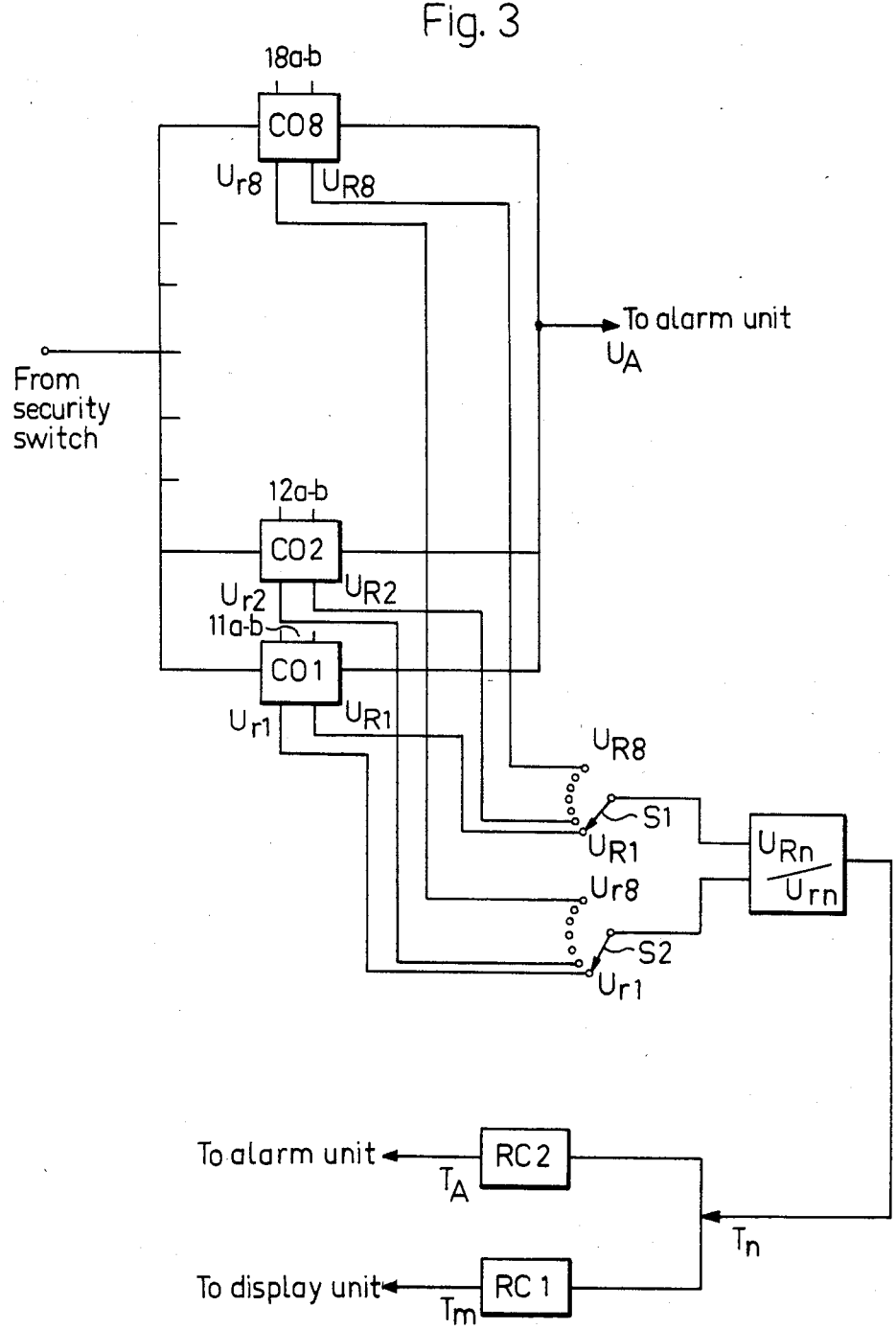
FIG. 3 is a schematic block diagram of the control and monitoring units within the dotted lines in FIG. 2.

The control and monitor units are illustrated schematically in FIG. 3. The DC voltage obtained from the power supply via the security switch is applied to each one of the parallelly connected control units C01, C02, ..., C08, respectively. Each control unit is connected to the corresponding terminal pair 11a–b, 12a–b, ..., 18a–b, for electrically feeding the respective foil element 11–18, and is adapted to deliver three output voltages. A first output voltage $U_A$ (feeding voltage, Cf. FIG. 4) is applied to the alarm unit. In case this voltage exceeds a predetermined value, the alarm unit is activated primarily in order to protect the various electronic components in the control units. The second output voltage $U_{R1}$, $U_{R2}$, ..., $U_{R8}$, respectively, is applied to a first, sequentially operating switch S1, whereas a third output voltage $U_{r1}$, $U_{r2}$, ..., $U_8$, respectively, is applied to a second, sequentially operating switch S2. The two switches S1 and S2, which belong to the monitor unit 23 (FIG. 2), are synchronized so as to apply corresponding pairs of these output voltages to a voltage divider 30, the output of which, $U_{Rn}/U_{rn}$, n=1,2,..., 8, is proportional to the temperature $T_n$ of the corresponding foil element 11–18. The temperature signal $T_n$ is applied to two integrators RC1 and RC2 connected in parallel to each other. The first integrator RC1 has a relatively long time constant, and the output $T_m$ thereof indicates the average temperature value of the foil elements 11–18 and is applied to the display unit 25 for indicating the average temperature of the mattress. The second integrator RC2, on the other hand, has a relatively short time constant, and the output $T_A$ thereof corresponds to the actual temperature of the particular foil element and is applied to the alarm unit. If this indicated temperature value at any moment exceeds a first predetermined value, such as 42° C., or is lower than a second predetermined value, such as 15° C. (probably due to electronic malfunctioning), the alarm unit will activate the security switch for disconnecting the electrical feeding of the foil elements.

The principal structure of each control unit C01–C08 is illustrated in FIG. 4. A voltage controller 40, which includes a switching element and a LC-filter providing a DC-DC-conversion without substantial heat loss, controls the feeding voltage by means of an operational amplifier OP inserted in a feed-back loop. The output voltage of the voltage controller 40 is applied to a bridge containing the corresponding foil resistor strip $R_n$, n=1,2,..., 8, between the terminals a and b, and a reference resistor $r_n$, n=1, 2, ..., 8. The terminal b between the foil resistor $R_n$ and the reference resistor $r_n$ is connected to the negative input of the operational amplifier OP, whereas the positive input of the operational amplifier OP is connected to a reference voltage $U_{ref}$, which is manually adjustable for setting a predetermined temperature value (common to all foil elements).

During operation, the resistance of the foil resistor $R_n$ will vary linearly with the temperature thereof, but the operational amplifier OP and the voltage controller 40 controls the feeding voltage in such a way that the operating temperature of the particular foil element will be maintained substantially at the preset temperature value corresponding to $U_{ref}$. As can be easily calculated, the resistance of the foil resistor $R_n$ is equal to $r_n(U_{Rn}/U_{rn}-1)$. Thus, the voltage obtained at the output of the divider 30 (FIG. 3) corresponds to the resistance of the foil resistor $R_n$ and hence the temperature $T_n$ thereof.

The mattress and the control circuitry described above can be modified in many ways by those skilled in the art. Thus, the dimensions and the mechanical structure of the mattress can be adjusted in view of the requirements set forth by a particular application. Furthermore, the geometrical dimensions and the overlapping arrangement of the foil elements can also be modified.

In case a larger number of foil elements is used, the control and monitor units of the electrical circuitry may be partially replaced by a microprocessor or a computer.

Moreover, the "pad" does not have to be rectangular or planar but may have any suitable configuration, e.g., tubular (to enclose an arm or a leg) or even formed as a garment.

Finally, a plurality of applications outside the medical field are feasible, e.g., the use of the pad for room heating, preferably by disposing the pad in the floor of a room. In such a case, the pad will automatically provide an appropriate heat transfer with reduced heating power at those portions being covered by heat insulating objects, such as mats or pieces of furniture.

I claim:

1. An electrical heating pad, comprising a number of partially overlapping resistor foil elements (11–18), each such foil element having a separate pair of electrical feed terminals (11a–b, ..., 18a–b), wherein
   (a) substantially the whole area of the pad is divided into a plurality of sub-regions;
   (b) the foil elements (11–18) are positioned in an overlapping configuration such that in each subregion (11/15, 11/16, 12/15, 12/16, 13/17, 13/18, 14/17, 14/18) of the pad there is a unique pair of overlapping foil element parts; and
   (c) the feed terminals (11a–b, ..., 18a–b, respectively) of each foil element in such a pair of partially overlapping foil elements is connectable to an electrical power unit so as to permit individual sensing of the respective temperature-dependent resistance thereof, whereby the temperature of each sub-region of the pad can be monitored individually.

2. A heating pad as claimed in claim 1, wherein the foil elements (11–18) are elongated and oriented in different directions so as to partially overlap each other.

3. A heating pad as claimed in claim 2, wherein the foil elements (11–18) are rectangular and oriented in mutually perpendicular directions.

4. A heating pad as claimed in claim 3, wherein the heating pad is divided into rectangular or square portions, each such portion being divided into at least four of said sub-regions, and including at least two foil elements (e.g., 15, 16) extending in a second direction perpendicular to said first direction.

5. An electrical power unit for electrically feeding and monitoring a heating pad as claimed in any one of claims 2 to 4 and 1, wherein the power unit includes a number of circuit units (C01–C08) being connectable between a power source (20) and each one of said foil element feed terminal pairs (11a–b, ..., 18a–b), each such circuit unit (C01–C08) being adapted to sense the temperature-dependent resistance ($R_n$) of the corresponding foil element, whereby the temperature ($T_n$) at each of said sub-regions is monitored individually.

6. An electrical power unit as claimed in claim 5, wherein said circuit units (C01–C08) are also adapted to control the electrical feeding ($U_{Rn}$–$U_{rn}$) to said terminal pairs (11a–b, ..., 18a–b) so as to keep all parts of the heating pad at a predetermined temperature.

7. An electrical power unit as claimed in claim 6, wherein each control unit (C01–C08) comprises a comparator (OP), a first input of which is connected to a voltage ($U_{rn}$) corresponding to the feeding voltage and a second input of which is connected to an adjustable reference voltage ($U_{ref}$) corresponding to a desired temperature, and the output of which is connected to a voltage controlling device (40).

8. An electrical power unit as claimed in claim 7, wherein said voltage controlling device (40) includes a switching element coupled to a filter providing a stable, variable controlling voltage which is applied to the respective foil element terminal pair.

9. An electrical power unit as claimed in claim 5, wherein said circuit units (C01–C08) are adapted to determine the resistance ($R_n$) of each foil element by sensing the voltages ($U_{Rn}, U_{rn}$) in a bridge, which comprises the foil element resistor ($R_n$) and a reference resistor ($r_n$) connected in series, and calculating the quotient ($U_{Rn}/U_{rn}$) of the voltage values ($U_{Rn}$, $R_{rn}$) obtained at each side of the foil element resistor ($R_n$).

10. An electrical power unit claimed in claim 9, wherein a monitor unit (23) is adapted to sense said circuit units (C01–C08) sequentially, said monitor unit including a divider (30) for dividing the two voltage values ($U_{Rn}, U_{rn}$) sensed by each circuit unit.

11. An electrical power unit as claimed in claim 5, temperature-depending output signal ($T_n$) is applied, on the one hand, via an integrator (RC1) having a relative long time constant to an indicator (25) for indicating the average temperature ($T_m$) of the foil elements and, on the other hand, via an integrator (RC2) having a relatively short time constant to a detector (24) detecting critically high or low temperature values of a single foil element.

12. An electrical power unit as claimed in claim 11, wherein said detector is connected to an alarm unit (24) and/or a security switch (22) adapted to interrupt the feeding power to at least one foil element (11–18) in case a critically high or low temperature has been detected.

* * * * *